(12) United States Patent
Anderson et al.

(10) Patent No.: US 6,578,107 B1
(45) Date of Patent: Jun. 10, 2003

(54) METHOD AND SYSTEM FOR PREFETCHING DATA WHERE COMMANDS ARE REORDERED FOR EXECUTION

(75) Inventors: Clark Anderson, Rochester, MN (US); David Robison Hall, Rochester, MN (US); Alice Louise Kub, Oronoco, MN (US); Louise Ann Marier, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,941

(22) Filed: May 25, 2000

(51) Int. Cl.$^7$ .............................................. G06F 12/60
(52) U.S. Cl. ..................................................... 711/113
(58) Field of Search ................... 707/101, 3, 200–205; 711/113; 360/63; 717/113

(56) References Cited

U.S. PATENT DOCUMENTS

| | | | | |
|---|---|---|---|---|
| 5,548,795 A | * | 8/1996 | Au ................................ | 710/52 |
| 5,937,426 A | * | 8/1999 | Sokolov ....................... | 711/113 |
| 5,966,726 A | * | 10/1999 | Sokolov ....................... | 711/113 |
| 6,047,334 A | * | 4/2000 | Langendorf et al. ........... | 710/5 |
| 6,088,772 A | * | 7/2000 | Harriman et al. ............ | 711/158 |
| 6,092,149 A | * | 7/2000 | Hicken et al. ............... | 711/112 |
| 6,145,052 A | * | 11/2000 | Howe et al. ................. | 711/112 |
| 6,301,639 B1 | * | 10/2001 | Cleavinger et al. ......... | 711/112 |
| 6,311,256 B2 | * | 10/2001 | Halligan et al. ............ | 711/158 |
| 6,339,811 B1 | * | 1/2002 | Gaertner et al. ............ | 711/112 |
| 6,373,648 B2 | * | 4/2002 | O'Connor ................ | 360/246.6 |
| 6,490,635 B1 | * | 12/2002 | Holmes ......................... | 710/3 |
| 6,490,651 B1 | * | 12/2002 | Shats et al. ................. | 711/112 |

OTHER PUBLICATIONS

Tomkins et al., "Informed Multi–Process Prefetching and Cashing", 1997, Sigmetrics'97, ACM, pp 100–114.*

* cited by examiner

Primary Examiner—John Breene
Assistant Examiner—S R Pannala
(74) Attorney, Agent, or Firm—Bracewell & Patterson, LLP; Roy W. Truelson

(57) ABSTRACT

A method for prefetching data for a cache memory from a mass-storage device having a controller that executes a plurality of reordered commands. The method includes predetermining an extra time interval for each of the plurality of reordered commands. Next, prior to executing the next reordered command, data located subsequent to data requested from a committed command is prefetched utilizing the predetermined extra time interval of the next command. In a related embodiment, the method includes executing a command reordering algorithm during which the seek and latency time periods of each of the plurality of reordered commands is computed.

14 Claims, 2 Drawing Sheets

METHOD AND SYSTEM FOR PREFETCHING DATA WHERE COMMANDS ARE REORDERED FOR EXECUTION

BACKGROUND OF THE INVENTION

1. Field of the Invention

The present invention relates generally to digital data storage systems, such as disk drives, and in particular to prefetching data from a data storage system to a cache memory. Still more particularly, the present invention relates to a method and system for prefetching data where commands are reordered for execution.

2. Description of Related Art

A digital data storage system typically includes one or more storage devices that store data on storage media such as magnetic or optical data storage disks. Within magnetic disk drive systems, a head disk assembly generally consists of one or more hard disks and a hard disk drive controller that is utilized to manage local operations involving the hard disks. The hard disks are rigid platters, typically constructed of aluminum alloy or a mixture of glass and ceramic, which are covered with a magnetic coating. Generally, two or three platters are stacked vertically on a common spindle that is rotated by a disk drive motor.

The only other moving part within a typical hard drive assembly is a head positioning system that has a recording head associated with each side of each platter. In most modern drives, the recording heads are mounted at the end of small ceramic sliders that are elevated just above and below the platter's surface. The sliders are supported by an air bearing surface that is self-pressurized by the airflows generated by the rapidly spinning disk. Each head is also connected to a flexible actuator arm that supports the entire head flying unit. More than one of such arms may be employed together to form a single armature unit.

Each head scans the hard disk platter surface during a "read" or "write" operation. The head/arm assembly is positioned over the hard disk platter surface utilizing an actuator, also called a voice coil actuator, driven by a servo voice coil motor. The stator of the voice coil if motor is mounted to a base plate or casting on which is mounted a spindle supporting the disks. The base plate, in turn, is mounted to a frame via a compliant suspension. When current is applied to the motor, the voice coil motor develops a force, or torque, that is substantially proportional to the applied current. The arm acceleration is therefore substantially proportional to the magnitude of the applied current. As the head approaches the desired track, a reverse polarity signal, acting as a brake, is applied to the actuator, to cause the recording head to stop over a desired location on the platter surface.

After a disk drive controller receives an instruction from a user or a bus master, the controller causes a disk drive motor to actuate disk heads to move to the specified location and retrieve the requested data. The time required to store and retrieve data on disk drives is a function of four key parameters: seek times, rotational latencies, data transfer times and overheads. These factors are designed into the disk drive along with features incorporated into the drives to lessen the impact of these parameters in various workloads and logical environments. The term "workload" describes the dynamic qualities of the requests to store and retrieve data such as transfer length, transfer direction (to/from drive, store/retrieve or write/read), spatial location of data relative to past and future requests, and temporal location, i.e., how fast are the request/commands sent to the drive. "Logical environment" describes the static qualities of the requests along with which features utilized in the drive are allowed to be employed. These features include data caching algorithms, command queuing and command reordering algorithms.

Seek time is the time required to position the disk head over the recording surface. Furthermore, because the disk drives have spinning media platters, a rotational latency while the platter spins to get the data in place for reading and writing is also introduced. Typically, disk I/O performance is dominated by these two factors, i.e., seek and latency, that are introduced by the mechanical parts of the disk in moving to a location where data is stored.

To minimize seek and rotational time delays, data storage systems incorporate disk data caches and command reordering algorithms that utilize command queuing. Disk caches take advantage of the principle of locality of references well known in the programming art. Typically the data from the disk is buffered into a memory device with a relatively fast access time. If the data requested already resides in the cache memory, the controller can transfer the data directly from the cache memory. Performance is increased because accessing data from the cache memory is substantially faster than accessing data from a disk drive.

Command reordering algorithms take advantage of a feature called command queuing. If commands are allowed to be queued, the host system can give the drive controller multiple requested commands, without the drive having completed prior requested commands. Besides other benefits, such as being able to overlap command overhead with seeking, latency and transferring data to/from disk, this means that the drive controller has multiple commands from which to choose a command to execute next. Algorithms can be employed that determine the "best" candidate command to be executed next. The physical design of the disk drive e.g., seek times, latency, and how the data is laid out in the disk surface, along with host system design determine what is "best." For example, one algorithm may select the next command to be the one that would complete the soonest. Another algorithm may choose a combination of C commands such that the group of C commands would execute faster than any other groups of C commands. Another algorithm may take into account that executing certain types of commands, e.g., requests to certain blocks, reads versus writes, etc., would be better than other types of commands. Despite selecting the "best" command to execute next, there is still "extra" time when the drive is not seeking or transferring data.

For workloads that frequently access data that is located near, and after, previously requested data, cache prefetch techniques are effective in increasing cache hit ratios. However, in high speed workload environments where queuing is employed and command reordering is allowed, any time not spent executing direct requests from a host system, i.e., prefetching data that may be subsequently requested, is considered "lost" time.

There are currently three approaches to increase the cache hit ratio for the workload environments employing command reordering and queuing. One approach uses a minimum prefetch algorithm. As defined in the Small Computer Systems Interface (SCSI) standard, minimum prefetch instructs the drive that it must prefetch "X" amount of data blocks following the completion of read commands.

A second approach utilizes a cache segmentation scheme that forces the size of a given cache segment to hold the same amount of data as a physical track. Consequently, track caching algorithms then can require that an entire track be read before executing a subsequent command. Both these approaches involve forcing prefetching of data after the completion of previous commands. However, they also reduce the effectiveness of command reordering algorithms by not allowing certain "best" command candidates to be executed.

The third approach prefetches data located prior to requested data on the next command to be executed, instead of prefetching data located after data requested from a previously executed command. This technique is commonly known as "Zero Latency Reads" (ZLRs). An analysis of several workload environments, however, has indicated that data located after previously requested data is more likely to be accessed than data located before previously accessed data.

According, what is needed in the art is an improved and more efficient method for prefetching data that mitigates the above-discussed limitations.

SUMMARY OF THE INVENTION

It is therefore an object of the present invention to provide an improved data storage system.

It is another object of the present invention to provide an improved method and system for prefetching data.

To achieve the foregoing objects, and in accordance with the invention as embodied and broadly described herein, a method is disclosed for prefetching data for a cache memory from a mass-storage device having a controller that executes a plurality of commands. The method includes predetermining an extra time interval for each of the plurality of commands. Next, prior to executing a next command, data located subsequent to data requested from a committed, or presently executing, command is prefetched utilizing the predetermined extra time interval of the next command. In a related embodiment, the method includes executing a command reordering algorithm during which the seek and latency time periods of each of the plurality of commands is computed.

The present invention discloses a novel method for prefetching data that efficiently utilizes the "extra time" during which a disk drive is spinning accomplishing nothing. The present invention takes advantage of the condition that access time for subsequent commands in a non-sequential, i.e., reordered, workload environment is a function of both the rotational time between the end of the last block of data accessed for a previous command and the beginning of the first block of data for the next command executed, and the time it takes to seek the heads from one radial position to the target radial position on the disks. It should be noted that even though the seek time may be shorter than the rotational time, the total access time is equal to the rotational time. Furthermore, if the seek time is greater than the rotational time, the total access time is equal to the rotational time plus an integer number of complete revolution times.

The present invention prefetches data while minimizing the effects of seek times, rotational latencies and data rates in certain workload environments that have random-like spatial locality. Command queuing and reordering algorithms are employed in these workload environments to aid perceived disk drive speed, but inhibit traditional data caching methods from being very effective. In an advantageous embodiment, utilizing information, e.g., seek and latency periods, often gathered for typical command reordering algorithms, the present invention identifies extra time that the drive does not need to access subsequent commands selected by the reordering algorithm. It should be noted that in other advantageous embodiments, the present invention may be practiced with reordering algorithms that do not calculate seek and latency periods. In these situations, seek and latency times for the executable commands are computed separately. The identified extra time is effectively utilized in prefetching data.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF ILLUSTRATIVE EMBODIMENT

Figure 1:
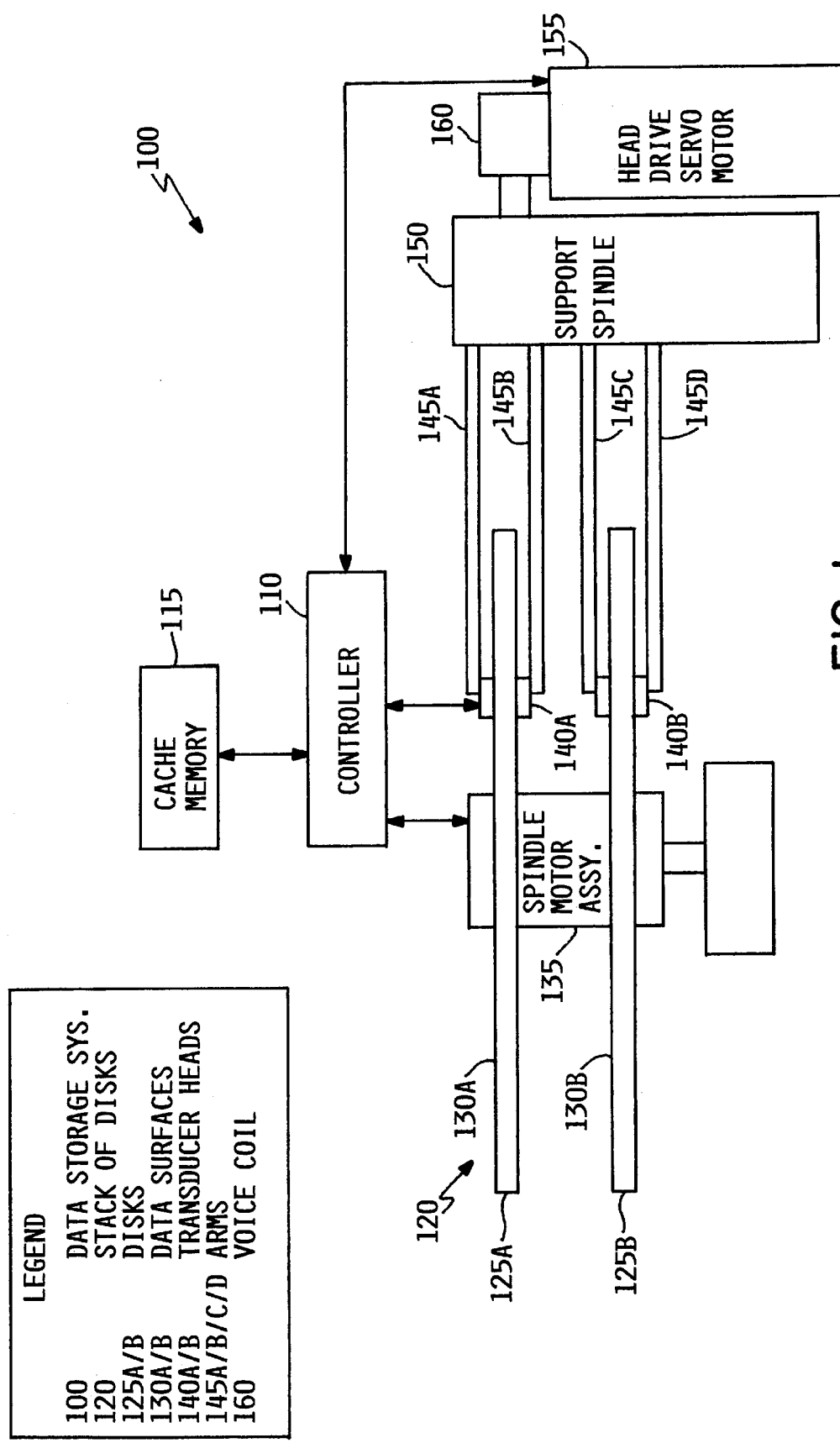
FIG. 1 illustrates an embodiment of a digital data storage system that provides a suitable environment for the practice of the present invention.

With reference now to the figures, and in particular, with reference to FIG. 1, there is depicted an embodiment of a digital data storage system 100 that provides a suitable environment for the practice of the present invention. Data storage system 100 is illustrated in a simplified and diagrammatic form sufficient for an understanding of the present invention and includes a controller 110 coupled to a cache memory 115. It should be noted that the utility of the present invention is not limited to the details of any one particular data storage system construction.

Data storage system 100 also includes a stack 120 of disks, generally designated 125, each of which having at least one data surface 130. Disks 125 are generally mounted parallel to one another for simultaneous rotation on and by an integrated spindle and motor assembly 135. Information on each disk surface 130 is read from or written to by a corresponding transducer head assembly 140 movable in a path having a radial component across rotating disk surface 130.

Each transducer head 140 is mounted on a flexure spring (not shown) carried by an arm 145. Arms 145 are typically ganged together for simultaneous pivotal movement about a support spindle 150. Arms 145 are driven in pivotal movement by a head drive servo motor 155 that includes a voice coil 160 cooperating with an internal magnet and core assembly. Drive signals applied to voice coil 160 cause arms 145 to move in unison to position transducer heads 140 in registration with information storage tracks on disk surfaces 130 where information is written or read.

Data storage system 100 is controlled in operation by signals provided by controller 110, including motor control and head positioning signals. In a typical arrangement, controller 110 provides an interface with a conventional computer (not shown) that, in an advantageous embodiment, provides data read and write commands. Servo position information is recorded on disk surface 130 and transducer heads 140 read this servo information to provide a servo position signal to controller 110. This information is utilized by controller 110 to provide position control signals. The purpose of this position feedback system is to assure accurate and continuous positioning of transducer heads 140 so that data is written to or read from precise locations on disk surfaces 130.

Figure 2:
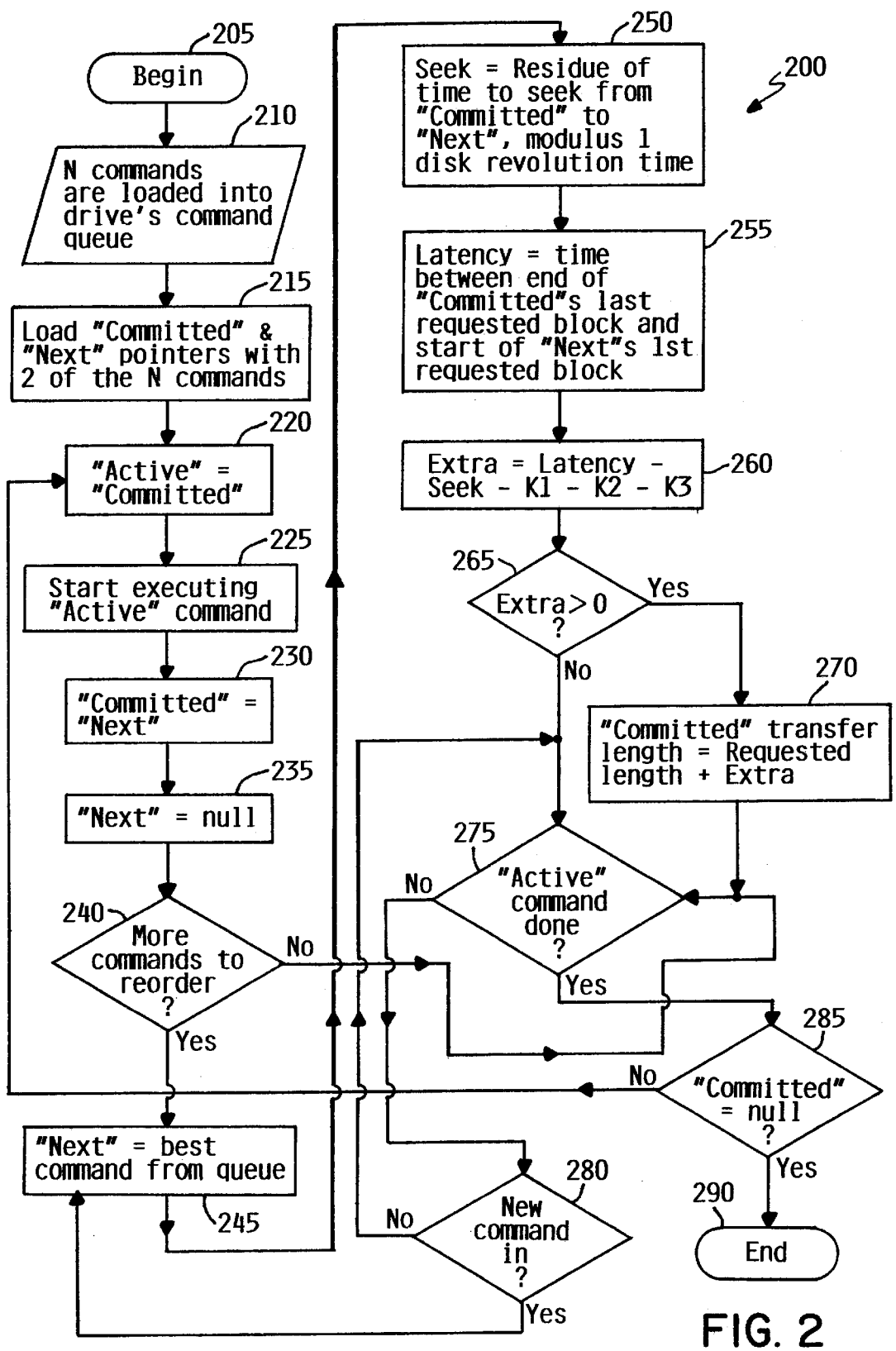
FIG. 2 illustrates a high-level flow diagram of an embodiment, of a process for prefetching data according to the principles of the present invention.

Referring now to FIG. 2, with continuing reference to FIG. 1, there is illustrated a high-level flow diagram of an embodiment of a process 200 for prefetching data according to the principles of the present invention. Process 200 is initiated, as depicted in step 205, when a controller (controller 110 shown in FIG. 1) receives more than 2 (N) commands for execution. As mentioned previously, these N commands, e.g., reads and/or writes, may originate from a computer coupled to data storage system 100. When the drive controller receives the command requests, it places them into a command queue as illustrated in step 210. It should be noted that typically, in an advantageous embodiment, each command fills one queue slot. In a preferred embodiment, the controller maintains 3 pointers that point to a given queue slot. These three pointers are "Active," "Committed" and "Next" that point to the first, second and third commands in the command queue to be executed, in that order, respectively. Initially, the Committed pointer points to the 1st command received and the Next pointer points to the 2nd command received, as depicted in step 215.

Next, as illustrated in step 220, after at least 2 commands have been received, the "Committed" command is made active by pointing the 3rd queue slot pointer, the Active pointer, to the same command. Execution of the "Active" command is then initiated as depicted in step 225. Integrated spindle and motor assembly 135 positions the transducer head assemblies 140 over the target location on the disk surfaces 130. After transducer head assemblies 140 have been positioned over the desired location, transfer of the requested data is initiated. A separate drive controller process (not shown) monitors the seek and enables the disk transfer after the seek completes. After the active command is started, the Committed pointer is then set to point to the command pointed to by the Next pointer, as depicted in step 230. Next, as illustrated in step 235, the Next pointer is set to "null" to signify that it is pointing to no particular queue slot.

Next, as depicted in decisional step 250, if it is determined that there are no commands in the drive controller command queue that have not been assigned to one of the 3 pointers, i.e., Active, Committed or Next, process 200 then jumps down to decisional step 275 which illustrates a determination of whether or not the active command has completed. Otherwise, potential command reordering takes place as illustrated in step 245.

In a preferred embodiment, controller 110 employs a command reordering algorithm, as depicted in step 245, to schedule the execution of the received commands. Alternatively, in another advantageous embodiment, the command reordering algorithm is resident and executed in the computer prior to transmission to controller 110. In either case, the executable commands $C_i$ (where i=1. N) are reordered for execution, as illustrated in step 245, by altering the Next pointer to point to the most advantageous command to be executed after the Committed command.

Furthermore, during the processing of the command reordering algorithm, in a preferred embodiment, controller 110 is also determining the amount of time needed to access subsequent commands, i.e., seek and latency times of each command. The seek and latency values are computed, as depicted in steps 250 and 255, wherein the seek residual is the residual amount of time left after moding the seek time by the time required for the disk to spin one revolution. Rotational latency, on the other hand, is the time period from the end of the last block of the Committed command to the beginning of the first block of the Next command. In another advantageous embodiment, the seek and latency values are determined when the command reordering algorithm is executed, as illustrated in step 245. Following the determination of the seek and latency periods, the amount of time that the drive is expected to be simply spinning, i.e., after the seek operation completes and before requested data is read or written, is determined next as illustrated in step 260. This period is also known as "extra time." This extra time as defined and illustrated in step 260 is the time difference between the rotational latency and the seek time residual minus constants K1, K2 and K3. Constant K1 is utilized to factor out uncertainty and equals any variance, or uncertainty, in the ability to successfully read, or write, following a seek. The constant K2 is equal to the overhead time needed to start a disk transfer after a seek completes and constant K3 equals any extra time allocated to the servo subsystem to complete the seek and reduce power consumption. Constant K3 is a mechanism to allow power versus performance tradeoffs. The computed extra time for each command is then saved utilizing conventional methods well known in the programming arts, such as a file or a register. Alternatively, in another advantageous embodiment, the extra time values are saved as entries in an associated table.

Following the computation of the extra time, as illustrated in decisional step 265, the extra time is tested to determine if it is greater than zero. If it is determined that the extra time is greater than zero time, the amount of data to be read for the "Committed" command is programmed to be equal to the requested data plus the amount of data that can read in the amount of extra time that had been previously calculated as depicted in step 260 above, as illustrated in step 270. Thus when the "Committed" command is made "active," as illustrated in step 220, and executed, as depicted in step 225, the requested data along with the prefetched data utilizing the extra time for the next scheduled command are read off disk surface 130 and transferred, in a preferred embodiment, to cache memory 115. While waiting for the "active" command to complete, as illustrated in step 275, process 200 tests for completion. If the command is not complete before the test is made, process 200 proceeds to decisional step 280 which, in turn, depicts a test to see if a new command has been added to the drive controller command queue since the last best "Next" command had been determined. Process 200 then proceeds back to step 275 if it is determined that no other commands have been received. On the other hand, process 200 proceeds back to step 245 if it is determined that at least one command has been received since the last best command had been determined to be the "Next" command. After the data for the "Active" command has been transferred, process 200 is repeated beginning at step 220 for the next command, if there are more commands to be executed as illustrated in step 285. If, on the other hand, there are no more commands to execute, i.e., Committed pointer is pointing to a null value, the process ends as depicted in step 290.

In summary, the execution of a seek operation to the target track for the next command is delayed for a time period equal to the predetermined extra time of the next command. During this delay period, the drive is prefetching data located after the requested data for the current command. Consequently, subsequent read commands requesting data that are present in the cache memory will be executed considerably faster than even those commands whose access times have been reduced utilizing command reordering algorithms.

From the foregoing, it should be apparent that the present invention minimizes the effects of seek times, rotational latencies and data rates in certain workload environments that have random-like spatial locality. Command queuing and reordering algorithms are employed in these workload environments to aid perceived disk drive speed, but inhibit traditional data caching methods from being very effective. Utilizing information often gathered for command reordering algorithms, the present invention identifies extra time that the drive does not need to access subsequent commands selected by the reordering algorithm. The identified extra time is effectively utilized in prefetching data.

In another advantageous embodiment, process 200 may be implemented in a computer system programmed to execute the method described herein above. Accordingly, in an advantageous embodiment, sets of instructions for executing the method disclosed herein are resident in RAM of one or more of the computer system. Until required by the computer system, the set of instructions may be stored as computer program product in another computer memory, e.g., a disk drive. In other advantageous embodiments, the computer program product may also be stored at another computer and transmitted to a user's computer system by an internal or external communication network, e.g., LAN or WAN, respectively.

It should be noted that although the present invention has been described, in one embodiment, in the context of a computer system, those skilled in the art will readily appreciate that the present invention is also capable of being distributed as a computer program product in a variety of forms; the present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for prefetching data for a cache memory from a mass-storage device having a controller that executes a plurality of reordered commands, comprising the steps of:

executing a command reordering algorithm, said step of executing a command reordering algorithm determining a respective seek period and a respective latency period for each of a plurality of next commands after respective currently committed commands;

predetermining a respective extra time interval for each of said plurality of next commands, said step of predetermining a respective extra time interval comprising predetermining extra time as a difference between said latency period and said seek period for the next command determined by said command reordering algorithm, and further reducing said difference by at least one reduction factor to provide an extra time which is less than the time difference between said latency period and said seek period determined by said command reordering algorithm; and prefetching data subsequent to fetching data requested from a committed command utilizing an extra time interval of a next command prior to executing said next command.

2. The method as recited in claim 1, wherein said step of predetermining a extra time interval includes the step of saving said extra time intervals in a table.

3. The method as recited in claim 1, further comprising the step of utilizing command queue pointers to identify said committed and said next commands.

4. A computer program product, comprising:

a computer-readable medium having stored thereon computer executable instructions for implementing a method for prefetching data for a cache memory from a mass-storage device having a controller that executes a plurality of reordered commands, said-computer executable instructions when executed, perform the steps of:

executing a command reordering algorithm, said step of executing a command reordering algorithm determining a respective seek period and a respective latency period for each of a plurality of next commands after respective currently committed commands;

predetermining a respective extra time interval for each of said plurality of next commands, said step of predetermining a respective extra time interval comprising predetermining extra time as a difference between said latency period and said seek period for the next command determined by said command reordering algorithm, and further reducing said difference by at least one reduction factor to provide an extra time which is less than the time difference between said latency period and said seek period determined by said command reordering algorithm; and prefetching data subsequent to fetching data requested from a committed command utilizing an extra time interval of a next command prior to executing said next command.

5. The computer program product as recited in claim 4, wherein said step of predetermining an extra time interval includes the step of saving said extra time intervals in a table.

6. A data storage system, comprising:

a controller;

a cache memory coupled to said controller;

a stack of disks, each of said disks having at least one magnetic surface;

means for reordering commands based on a determination of a respective seek period and a respective latency period for each of a plurality of next commands after respective currently committed commands;

means for predetermining a respective extra time interval for each of a plurality of next commands based on a difference between said latency period and said seek period for the next command determined by said means for reordering commands, said difference being further reduced by at least one reduction factor to provide an extra time which is less than the time difference between said latency period and said seek period determined by said means for reordering commands; and means for prefetching data subsequent to fetching data requested from a committed command utilizing an extra time interval of a next command prior to executing said next command.

7. The data storage system as recited in claim 6, wherein each of said disks having an associate transducer head assembly.

8. The data storage system as recited in claim 6, wherein said means for predetermining an extra time interval includes means for saving said extra time intervals in a table.

9. The data storage system as recited in claim 6, wherein said at least one reduction factor comprises at least one of the set consisting of: (a) a K1 constant representing a variance in the ability to successfully read or write following a seek; (b) a K2 constant representing overhead time needed to start a disk transfer after a seek completes; and (c) a K3 constant representing extra time allocated to a servo subsystem to complete a seek and reduce power consumption.

10. The data storage system as recited in claim 9, wherein said at least one reduction factor comprises a sum of said K1, K2 and K3 constants.

11. The method as recited in claim 1, wherein said at least one reduction factor comprises at least one of the set consisting of: (a) a K1 constant representing a variance in the ability to successfully read or write following a seek; (b) a K2 constant representing overhead time needed to start a disk transfer after a seek completes; and (c) a K3 constant representing extra time allocated to a servo subsystem to complete a seek and reduce power consumption.

12. The method as recited in claim 11, wherein said at least one reduction factor comprises a sum of said K1, K2 and K3 constants.

13. The computer program product as recited in claim 4, wherein said at least one reduction factor comprises at least one of the set consisting of: (a) a K1 constant representing a variance in the ability to successfully read or write following a seek; (b) a K2 constant representing overhead time needed to start a disk transfer after a seek completes; and (c) a K3 constant representing extra time allocated to a servo subsystem to complete a seek and reduce power consumption.

14. The computer program product as recited in claim 13, wherein said at least one reduction factor comprises a sum of said K1, K2 and K3 constants.

\* \* \* \* \*